(12) United States Patent
Cockrill

(10) Patent No.: US 11,577,327 B2
(45) Date of Patent: Feb. 14, 2023

(54) SYSTEMS, DEVICES, AND/OR METHODS FOR DRILLING

(71) Applicant: Huston G. Cockrill, Holliston, MA (US)

(72) Inventor: Huston G. Cockrill, Holliston, MA (US)

( * ) Notice: Subject to any disclaimer, the term of this patent is extended or adjusted under 35 U.S.C. 154(b) by 0 days.

(21) Appl. No.: 17/211,565

(22) Filed: Mar. 24, 2021

(65) Prior Publication Data
US 2022/0305568 A1    Sep. 29, 2022

(51) Int. Cl.
*B23B 31/36*    (2006.01)
*B23B 31/11*    (2006.01)

(52) U.S. Cl.
CPC ............. *B23B 31/36* (2013.01); *B23B 31/11* (2013.01); *Y10T 82/27* (2015.01)

(58) Field of Classification Search
CPC ................................ B23B 31/11; B23B 31/36
See application file for complete search history.

(56) References Cited

U.S. PATENT DOCUMENTS

| | | | | |
|---|---|---|---|---|
| 189,953 A * | 4/1877 | Niebell | ............... | B23B 33/00 82/170 |
| 2,447,711 A * | 8/1948 | Mikis | ............... | B23B 31/36 279/5 |
| 2,733,073 A * | 1/1956 | Phillips | ............... | B23B 31/36 279/90 |
| 2,833,544 A * | 5/1958 | Blades | ............... | B23B 31/36 279/6 |
| 4,583,432 A * | 4/1986 | Bricker | ............... | B23Q 3/104 269/902 |
| 4,666,353 A * | 5/1987 | Micek | ............... | B23B 31/36 279/6 |
| 5,752,706 A * | 5/1998 | Hodges | ............... | B23B 31/36 279/6 |
| 6,568,883 B1 * | 5/2003 | Fukui | ............... | B23D 77/00 408/239 R |
| 6,598,884 B1 * | 7/2003 | McCluskey | ............... | B23B 31/36 279/51 |
| 7,469,484 B2 * | 12/2008 | Marquart | ............... | B24B 19/04 279/6 |
| 9,248,508 B2 * | 2/2016 | Motschi | ............... | B23B 31/20 |
| 10,618,116 B2 * | 4/2020 | Woodman | ............... | B23B 31/20 |

FOREIGN PATENT DOCUMENTS

GB             720818 A    * 12/1954

* cited by examiner

*Primary Examiner* — Eric A. Gates
(74) *Attorney, Agent, or Firm* — Dale Jensen, PLC; Dale Jensen

(57) ABSTRACT

Certain exemplary embodiments can provide a system comprising a machine tool, a centerable holder, and a drill. The machine tool comprises a spindle and a tool holder. The centerable holder is pointed at the spindle of the machine tool. The centerable holder defining a pair of horizontal adjusters and a pair of vertical adjusters.

4 Claims, 3 Drawing Sheets

2000

SYSTEMS, DEVICES, AND/OR METHODS FOR DRILLING

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

Figure 1:
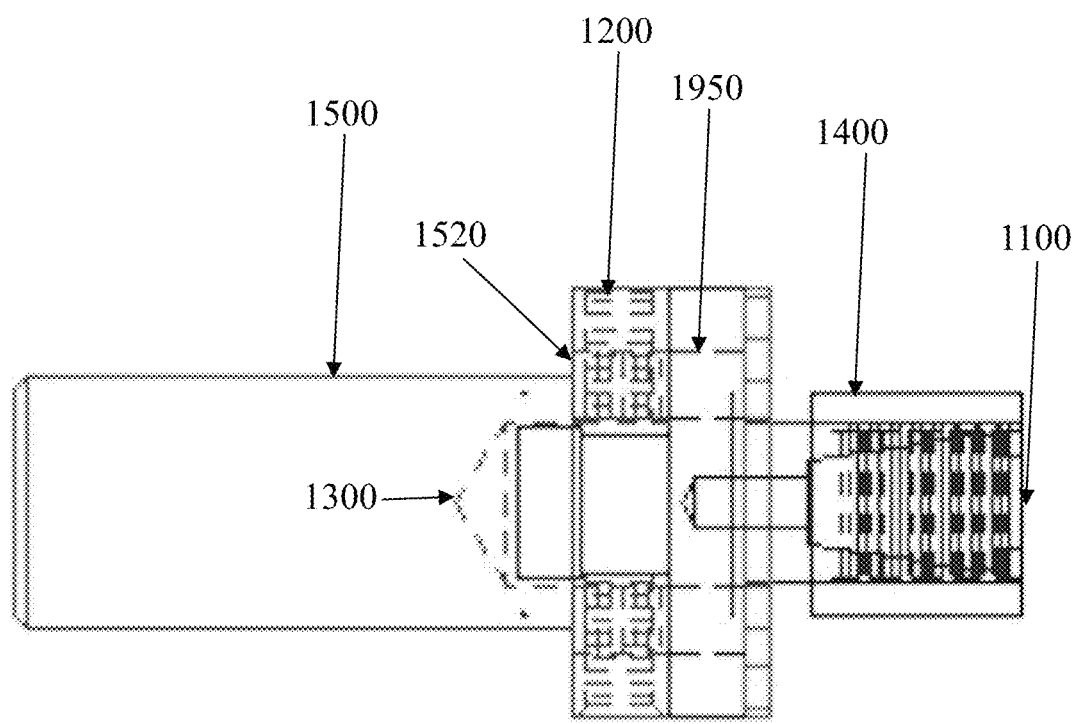
FIG. 1 is a plan view of an exemplary embodiment of a system 1000.

Certain exemplary embodiments can provide a system comprising a machine tool, a centerable holder, and a drill. The machine tool comprises a spindle and a tool holder. The centerable holder is pointed at the spindle of the machine tool. The centerable holder defining a pair of horizontal adjusters and a pair of vertical adjusters.

A machine tool is a machine for handling or machining metal or other rigid materials by cutting and/or boring, etc. A machine tool can employ a component (e.g., a drill) that does the cutting or shaping. Machine tools have a holder, a collet or chuck in the spindle, which constrains workpieces and provides a stable centered base to the movable of parts of the machine. Thus the relative movement between the workpiece and a cutting tool (which is called the toolpath) is controlled or constrained by the machine to at least some extent.

A lathe is a machine tool that rotates a workpiece about an axis of rotation to perform various operations such as drilling and turning, with tools that are applied to the workpiece to create an object with symmetry about that axis.

At one end of the bed is a headstock. The headstock contains high-precision spinning bearings. Rotating within the bearings is a horizontal axle, with an axis parallel to the bed, called the spindle. Spindles are powered and impart motion to the workpiece. Spindles are driven by a power source such as electric motor, which can directly or indirectly cause a spindle to rotate.

At an opposing end of the bed from the spindle on a two axis Computer Numerically Controlled ("CNC") lathe is usually a tooling turret holding many different tools positioned at any convenient point on the bed by a CNC controlled ball screw. The tooling turret is attached to a slide, which can slide left and right parallel to the axis of the bed and can bring a tooling hole directly in axial line with the headstock spindle. Each toolholder can be selected and positioned to approximate center depending on the accuracy of a curvic coupling, which can lock each turret position in place as it changes tools rotationally. There are many possibilities for introducing alignment problems with this system. A drill holder can have dents in its shank, unsquare faces, damaged jaws, and other inaccuracies brought about by various other factors. Merely clamping the tool holder or a drill in a bushing or drill chuck can push it off center in relation to the lathe spindle because of clearance between tool holes and slip bushings or tool shanks.

In a CNC metalworking lathe and in the case of drilling, metal is removed from the workpiece using a hardened drill, which is usually fixed to a solid turret tooling position, which is then moved against the workpiece using computer-controlled motors in at least two axes. As smaller and smaller drills are used they can be more affected by axial misalignment with the spindle, even when a spot drill is employed to accurately position the drill tip. If a drill is off-center, the resulting hole will be eccentric to the outer diameter of the part being drilled. The drill may even break off because of side force from misalignment.

In use, the device would be mounted in the lathe's turret tool holder inside of a split bushing. The tool holder's tool clamping screws would be tightened to clamp down on the slip bushing holding the device. A gage pin close to the diameter of the drill to be used would be inserted in the device's collet and tightened down with its tightening nut. Then the CNC machine tool would be programmed to bring that tool holder center to move to the center of the spindle. (Zero). Then a dial indicator would be affixed to the spindle. The pin and tool holder would be moved forward manually until positioned near the device collet and touching the gage pin's outside diameter. The coupling screws of FIG. 2 would be slightly loosened perhaps ⅛ turn. Then the (4) adjusting screws would each be carefully turned until the indicator shows the centrality of the device to the spindle. Then the (2) coupling screws would be re-tightened to hold the front plate of the device to the device's shank. Now the device can be backed away from the spindle. The gage pin can be removed from the collet. The drill of the same diameter can replace the pin in that collet. The drill is now perfectly centered on the spindle axis. With a change of the collet, different size drills can replace the current one, while still maintaining the centrality of the device up to the tolerance limits of the collet's manufacture.

FIG. 1 is a plan view of an exemplary embodiment of a system 1000, which comprises a machine tool 1100 (e.g., a lathe), a centerable holder 1200, and a drill 1300. Machine tool 1100 comprises a spindle 1400 and a tool holder 1500. Sometimes, tool holder 1500 is not sufficiently centered on spindle 1400. This is especially critical with tiny drills. Centerable holder 1200 is pointed at spindle 1400 of machine tool 1100. Centerable holder 1200 defining a pair of horizontal adjusters (see, horizontal adjusters 1600 of FIG. 2) and a pair of vertical adjusters (see, vertical adjusters 1700 of FIG. 2). Each of the pair of horizontal adjusters and the vertical adjusters comprises a threaded fastener (see, threaded fasteners 1800 of FIG. 2). Centerable holder 1200 is centered by a user via turning one or more threaded fasteners of the horizontal adjusters and the vertical adjusters.

Drill 1300 is coupleable to centerable holder 1200. Drill 1300 is centerable on an object held relative to spindle 1400 via centerable holder 1200.

Figure 2:
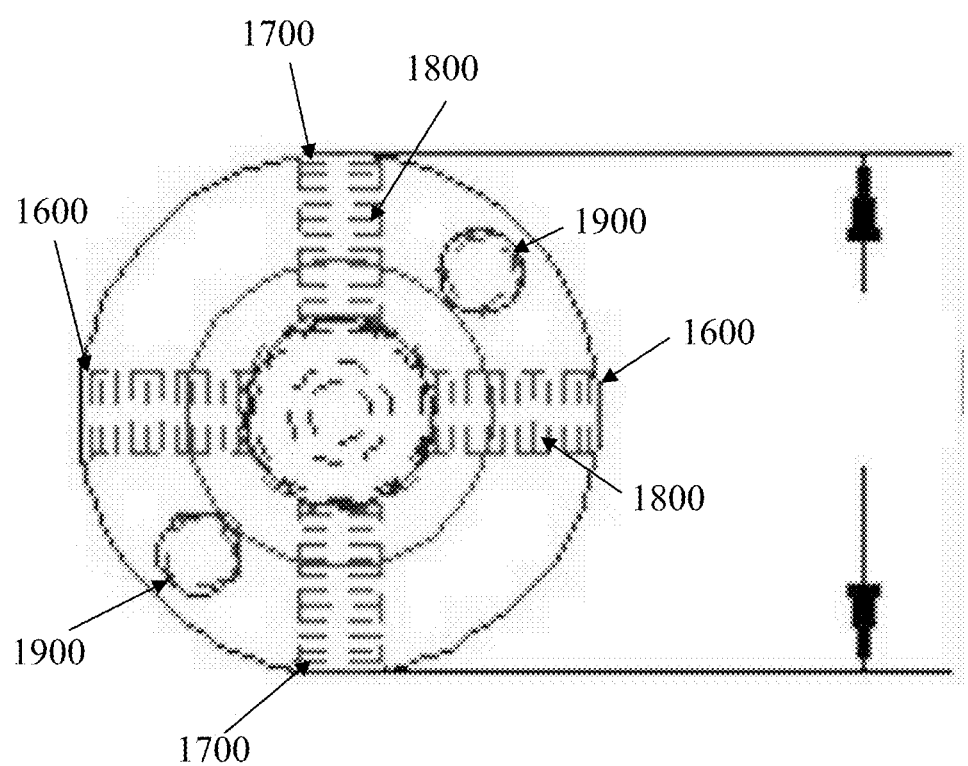
FIG. 2 is an end view of an exemplary embodiment of a system 2000.

Centerable holder 1200 is coupled to a shank 1520 of tool holder 1500 via a pair of fasteners (see, pair of fasteners 1900 of FIG. 2). Centerable holder 1200 is coupled to machine tool 1100 via clamping down on shank 1520 in a slip bushing 1950 which holds centerable holder 1200 in tool holder 1500 of machine tool 1100.

FIG. 2 is an end view of an exemplary embodiment of a system 2000, which illustrates horizontal adjusters 1600, vertical adjusters 1700, threaded fasteners 1800, and pair of fasteners 1900.

Figure 3:
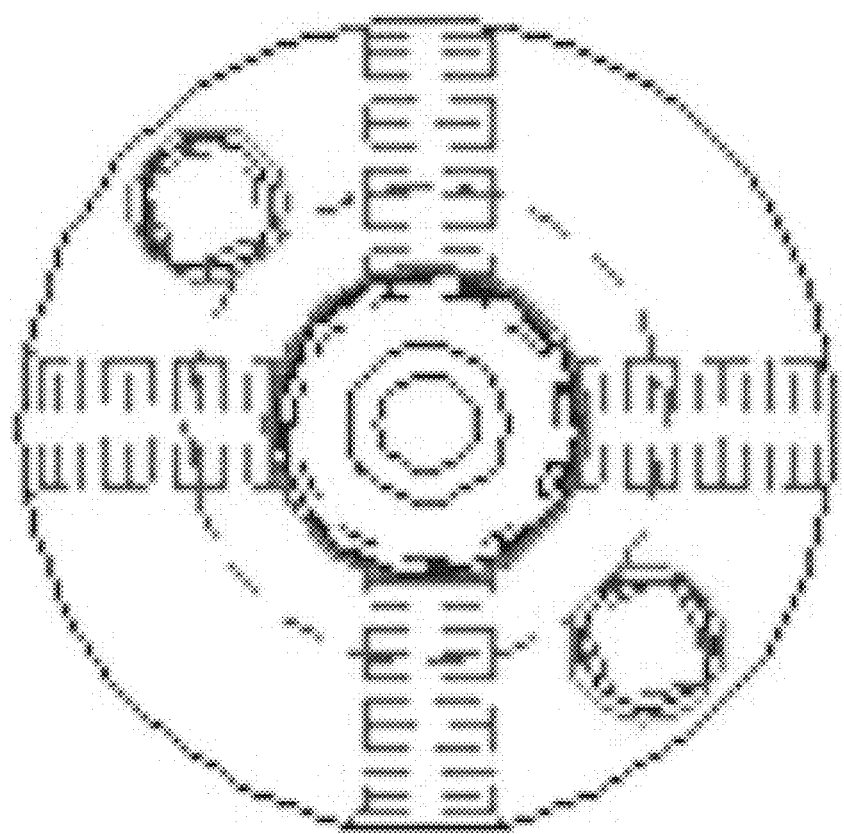
FIG. 3 is an end view of exemplary system 2000.

FIG. 3 is an end view of exemplary system 2000.

Definitions

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.

activity—an action, act, step, and/or process or portion thereof adapter—a device used to effect operative compatibility between different parts of one or more pieces of an apparatus or system.

adjuster—something that brings parts to a more effective relative position.

and/or—either in conjunction with or in alternative to.

apparatus—an appliance or device for a particular purpose associate—to join, connect together, and/or relate.

ball screw—a mechanical linear actuator that translates rotational motion to linear motion with little friction.

can—is capable of, in at least some embodiments.

cause—to produce an effect.

center—(n) a middle point of an object that is approximately equidistant from points on a surface of the object; (v) to place or fix at or around a center or central area.

centerable holder—a device that restrains motion of something gripped and allows movement of what is gripped relative to an axis.

centerline—a line through a center of something following an axis of symmetry.

clamp—n. a device used to join, grip, support, and/or compress. v. to join, grip, support, and/or compress.

collet—a casing or socket for holding a tool (such as a drill bit)

comprising—including but not limited to.

Computer Numerically Controlled—a machine tool controlled via a computer.

configure—to make suitable or fit for a specific use or situation.

connect—to join or fasten together.

constructed to—made to and/or designed to.

convert—to transform, adapt, and/or change.

couple—to physically join in some fashion.

coupleable—capable of being joined, connected, and/or linked together.

create—to bring into being.

curvic coupling—to toothed connection members with teeth spaced circumferentially about a face and with teeth, which have a characteristic curved shape when viewed in a place perpendicular to the coupling axis.

define—to establish the outline, form, or structure of determine—to obtain, calculate, decide, deduce, and/or ascertain.

device—a machine, manufacture, and/or collection thereof.

dial indicator—a dial display similar to a clock face with clock hands; the hands point to graduations in a circular scales on the dial which represent the distance of the probe tip from a zero setting.

drill—(n) a system comprising an edged or pointed end constructed to make holes in hard substances via rotation of the edged or pointed end; (v) to make an aperture via boring with a bit.

fastener—one (or more) restraints that attach to, extend through, penetrate, and/or hold something. For example, a fastener can be one (or more) bolt, bolt and nut assembly, rivet, weldment, nail, screw, peg, staple, clip, buckle, clasp, clamp, and/or plastic push rivet, etc.

gage pin—a highly accurate and straight conical pin, approximately 50 mm long.

holder—a component that grasp something in a manner to control positioning.

horizontal—parallel to and/or in the plane of the horizon.

install—to connect or set in position and prepare for use.

lathe—a machine tool that rotates a workpiece about an axis of rotation to perform various operations such as cutting, drilling, and turning, with tools that are applied to the workpiece.

machine tool—a system constructed to handle or machine metal or other rigid materials, such as by cutting and/or boring, etc.

may—is allowed and/or permitted to, in at least some embodiments.

method—a process, procedure, and/or collection of related activities for accomplishing something.

pair—two similar things used together.

plurality—the state of being plural and/or more than one.

pointed at—directed toward.

predetermined—established in advance.

provide—to furnish, supply, give, and/or make available.

receive—to get, take, acquire, and/or obtain.

repeatedly—again and again; repetitively.

request—to express a desire for and/or ask for.

select—to make a choice or selection from alternatives.

set—a related plurality.

shank—a back portion of a component of a tool.

slip bushing—a sleeve having an inner diameter and outer diameter.

sometimes—on occasion.

spindle—a rotating axis of the machine, which often comprises a shaft. The shaft itself is often called a spindle, but also, the term spindle is used metonymically to refer to the entire rotary unit, comprising not only the shaft itself, but also bearings and anything attached to the shaft (e.g., a chuck, etc.).

split bushing—a sleeve having an inner diameter and outer diameter.

spot drill—a drill constructed to make a shallow hole or one just deep enough to locate a spot (as for use as a guide in further drilling).

store—to place, hold, and/or retain.

substantially—to a great extent or degree.

sufficiently—enough in quantity for a certain purpose.

support—to bear the weight of, especially from below.

system—a collection of mechanisms, devices, machines, articles of manufacture, processes, data, and/or instructions, the collection designed to perform one or more specific functions.

threaded fastener—one (or more) restraints comprising projecting helical ribs via which parts can be screwed together, which restraints attach to, extend through, penetrate, and/or hold something and engage via. For example, a threaded fastener can be one (or more) of a bolt, a bolt and nut assembly and/or a screw, etc.

tolerance limits—limits of variation in a physical dimension of a manufactured object.

tool—a cutting or shaping part in a machine tool transmit—to send, provide, furnish, and/or supply.

turn—to change a position of by traversing an arc.

turret toolholder—where all tooling is mounted and accessible rotationally vertical—substantially perpendicular to horizontal.

via—by way of and/or utilizing.

Note

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, description, abstract, drawing figure, etc.) of this application, unless clearly specified to the contrary, such as via explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

no characteristic, function, activity, or element is "essential";

any elements can be integrated, segregated, and/or duplicated;

any activity can be repeated, any activity can be performed by multiple entities, and/or any activity can be performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element is followed by a drawing element number, that drawing element number is exemplary and non-limiting on claim scope. No claim of this application is intended to invoke paragraph six of 35 USC 112 unless the precise phrase "means for" is followed by a gerund.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive, and the scope of subject matter protected by any patent that issues based on this application is defined only by the claims of that patent.

What is claimed is:

1. A system comprising:
   a machine tool, the machine tool comprising a spindle and a tool holder, wherein the tool holder is sometimes not sufficiently centered on the spindle;
   a slip bushing, the slip bushing having an annular cross section,
   a centerable holder, the centerable holder substantially surrounding the slip bushing, the centerable holder pointed at the spindle of the machine tool, the centerable holder defining a pair of horizontal adjusters and a pair of vertical adjusters, each of the pair of horizontal adjusters and the vertical adjusters comprising a threaded fastener, each threaded fastener of each of the pair of horizontal adjusters and the vertical adjusters passing through the slip bushing, the centerable holder centered by a user via turning one or more threaded fasteners of the horizontal adjusters and the vertical adjusters; and
   a drill, the drill coupleable to the centerable holder, the drill centerable on an object held relative to the spindle via the centerable holder.

2. The system of claim 1, wherein:
   the machine tool is a lathe.

3. The system of claim 1, wherein:
   the centerable holder is coupled to a shank of the tool holder via a pair of fasteners; and
   the centerable holder is coupled to the machine tool via clamping down on the shank in the slip bushing which holds the centerable holder in the tool holder of the machine tool.

4. The system of claim 1, wherein:
   the centerable holder is coupled to the machine tool via clamping down on a shank in the slip bushing which holds the centerable holder in the tool holder of the machine tool.

* * * * *